United States Patent
Sakai et al.

(10) Patent No.: US 8,735,854 B2
(45) Date of Patent: May 27, 2014

(54) SCINTILLATOR PANEL

(75) Inventors: Mika Sakai, Hachioji (JP); Takehiko Shoji, Hachioji (JP); Yasushi Nagata, Kodaira (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 186 days.

(21) Appl. No.: 13/257,111

(22) PCT Filed: Feb. 24, 2010

(86) PCT No.: PCT/JP2010/052839
§ 371 (c)(1),
(2), (4) Date: Sep. 16, 2011

(87) PCT Pub. No.: WO2010/106884
PCT Pub. Date: Sep. 23, 2010

(65) Prior Publication Data
US 2012/0009375 A1  Jan. 12, 2012

(30) Foreign Application Priority Data

Mar. 19, 2009 (JP) ................ 2009-067687

(51) Int. Cl.
*G21K 4/00* (2006.01)
*G01T 1/20* (2006.01)

(52) U.S. Cl.
USPC ............... 250/484.4; 250/361 R; 250/370.11

(58) Field of Classification Search
USPC .......................... 250/484.4, 370.11
See application file for complete search history.

(56) References Cited

U.S. PATENT DOCUMENTS

| | | |
|---|---|---|
| 7,265,371 B2 * | 9/2007 | Shoji et al. ............ 250/581 |
| 2002/0070351 A1 * | 6/2002 | Yanagita et al. ......... 250/484.4 |
| 2008/0179533 A1 * | 7/2008 | Nagata et al. .......... 250/370.11 |

FOREIGN PATENT DOCUMENTS

| | | |
|---|---|---|
| JP | 63-215987 A | 9/1988 |
| JP | 1-316696 A | 12/1989 |
| JP | 2002-131499 A | 5/2002 |
| JP | 2004-325300 A | 11/2004 |
| JP | 3789785 B | 4/2006 |
| JP | 2007-040733 A | 2/2007 |

* cited by examiner

*Primary Examiner* — Casey Bryant
(74) *Attorney, Agent, or Firm* — Lucas & Mercanti, LLP

(57) ABSTRACT

A scintillator panel exhibiting enhanced moisture resistance is disclosed, comprising a scintillator sheet provided on a substrate with a scintillator layer, and the whole of the scintillator sheet is covered with a protective layer and a space in which gas is capable of flowing is provided between the protective layer and the scintillator sheet.

15 Claims, 2 Drawing Sheets

SCINTILLATOR PANEL

CROSS REFERENCE TO RELATED APPLICATION

This application is a U.S. National Phase Application under 35 USC 371 of International Application PCT/JP2010/052839 filed Feb. 24, 2010, which in turn claimed the priority of Japanese Patent Application No. 2009-067687 filed Mar. 19, 2009, both of the applications are incorporated by reference herein.

FIELD OF THE INVENTION

The present invention relates to a scintillator panel which is excellent in moisture resistance.

TECHNICAL FIELD

There have been broadly employed radiographic images such as X-ray images for diagnosis of the conditions of patients on the wards. Specifically, radiographic images using a intensifying-screen/film system have achieved enhancement of speed and image quality over its long history and are still used on the scene of medical treatment as an imaging system having high reliability and superior cost performance in combination.

However, these image data are so-called analog image data, in which free image processing or instantaneous image transfer cannot be realized.

Recently, there appeared digital system radiographic image detection apparatuses, as typified by a computed radiography (also denoted simply as CR) and a flat panel Radiation detector (also denoted simply as FPD). In these apparatuses, digital radiographic images are obtained directly and can be displayed on an image display apparatus such as a cathode tube or liquid crystal panels, which renders it unnecessary to form images on photographic film. Accordingly, digital system radiographic image detection apparatuses have resulted in reduced necessities of image formation by a silver salt photographic system and leading to drastic improvement in convenience for diagnosis in hospitals or medical clinics.

The computed radiography (CR) as one of the digital technologies for radiographic imaging has been accepted mainly at medical sites. However, image sharpness is insufficient and spatial resolution is also insufficient, which have not yet reached the image quality level of the conventional screen/film system. Further, there appeared, as a digital X-ray imaging technology, an X-ray flat panel detector (FPD) using a thin film transistor (TFT), as described in, for example, the article "Amorphous Semiconductor Usher in Digital X-ray Imaging" described in Physics Today, November, 1997, page 24 and also in the article "Development of a High Resolution, Active Matrix, Flat-Panel Imager with Enhanced Fill Factor" described in SPIE, vol. 32, page 2 (1997).

The flat panel radiation detector (FPD) is featured in that the apparatus has become more compact than the CR and image quality at a relatively high dose is superior. Meanwhile, an photographing at a relatively low dose results in lowered S/N ratio due to electrical noises of TFT or a circuit itself and has not yet attained a sufficient image quality level.

To convert radiation to visible light is employed a scintillator panel made of an X-ray phosphor which is emissive for radiation. The use of a scintillator panel exhibiting enhanced emission efficiency is necessary for enhancement of the SN ratio in radiography at a relatively low dose. Generally, the emission efficiency of a scintillator panel depends of the scintillator thickness and X-ray absorbance of the phosphor. A thicker phosphor layer causes more scattering of emission within the phosphor layer, leading to deteriorated sharpness. Accordingly, necessary sharpness for desired image quality level necessarily determines the layer thickness.

Specifically, cesium iodide (CsI) exhibits a relatively high conversion rate of from X-rays to visible light. Further, a columnar crystal structure of the phosphor can readily be formed through vapor deposition and its light-guiding effect inhibits scattering of emitted light within the crystal, enabling an increase of the phosphor layer thickness (as described in, for example, Patent document 1). As is known in the art, an element such as thallium, sodium or rubidium, a so-called activator, was contained in cesium iodide to achieve enhanced emission efficiency.

However, there are problems such that CsI crystals exhibit deliquescence and are deteriorated with aging. It is therefore necessary to provide protection from moisture and it is known to cover a scintillator with an organic film for protection. There is generally known constitution in which a scintillator is overall covered with an organic film made of poly-p-xylylene or parylene (as described in, for example, Patent document 2).

However, there were produced problems that covering spacing between columnar crystals with the foregoing organic film made it difficult to control the humidity around. CsI crystal and a crystalline portion in which moisture permeated was easily deliquescent, resulting in deformation of columnar crystals and leading to a lowering of sharpness.

Patent document 1: JP 63-215987 A
Patent document 2: JP 3789785 B

SUMMARY OF THE INVENTION

Problems to be Solved

The present invention has come into being in view of the foregoing problems and circumstances and it is an object of the present invention to provide a scintillator panel exhibiting enhanced moisture resistance.

Means for Solving the Problems

The foregoing problems related to the present invention can be solved by the following constitution.

1. A scintillator panel comprising a scintillator sheet provided on a substrate with a scintillator layer, and the whole of the scintillator sheet is covered with a protective layer and a space in which gas is capable of flowing is provided between the protective layer and the scintillator sheet.

2. The scintillator panel as described in the foregoing 1, wherein a moisture-absorbing material is disposed within the protective layer.

3. The scintillator panel as described in the foregoing 2, wherein a rigid plate is disposed on the opposite side of the substrate to the scintillator layer.

4. The scintillator panel as described in the foregoing 3, wherein the moisture-absorbing material is disposed on the opposite side of the substrate to the scintillator layer.

5. The scintillator panel as described in the foregoing 3 or 4, wherein an adhesion area between the substrate or the rigid plate and a moisture-absorbing material is in a range of 10 to 90% of a total area of the substrate or the rigid plate of the side to be adhered.

6. The scintillator panel as described in the foregoing 5, wherein an adhered portion between the substrate or the rigid plate and the moisture-absorbing material is formed in a matrix form.

7. The scintillator panel as described in any one of the foregoing 1 to 6, wherein the protective layer is a resin film.

8. The scintillator panel as described in the foregoing 7, wherein the protective layer is formed of a first resin film disposed on the side of the scintillator layer of the scintillator sheet and a second resin film disposed on the side of the substrate, peripheries of both resin films are fused to form a fused portion so that the fused portion is within ±0.2X from the center (X/2) in the direction of the thickness of the scintillator panel, wherein X is the thickness of the scintillator panel.

Effect of the Invention

There can be provided a scintillator panel superior in moisture resistance according to the foregoing means of the present invention. Namely, in the present invention, the whole of a scintillator sheet and a moisture-absorbing material is covered with a resin film and a gas can move within the protective layer, and thereby, the moisture-absorbing material is effectively employed, rendering it feasible to maintain the humidity around a crystal at a low level, whereby a panel superior in moisture resistance is achieved. In cases when using a resin film for a protective layer, a fused portion of the periphery is arranged at the position within ±20% from the center in the depth direction of a scintillator sheet, rendering it feasible to promote gas flow within the scintillator panel.

EMBODIMENTS OF THE INVENTION

The scintillator panel of the present invention is featured in that the scintillator panel comprises a scintillator sheet provided on a substrate with a scintillator layer, and the whole of the scintillator sheet is covered with a protective layer and a space in which gas is capable of flowing is provided between the protective layer and the scintillator sheet. This feature is a technical characteristic which the foregoing constitutions 1 to 8 have in common.

In one embodiment of the present invention, a moisture-absorbing material is preferably disposed within the protective layer.

It is preferred that a rigid plate is disposed on the opposite side of the substrate to the scintillator layer. Further, it is preferred that the moisture-absorbing material is disposed on the opposite side of the substrate to the scintillator layer. In that case, it is preferred that an adhesion area between the substrate or the rigid plate and a moisture-absorbing material is in a range of 10 to 90% of a total area of the substrate or the rigid plate of the side to be adhered. It is also preferred that an adhered portion between the substrate or the rigid plate and the moisture-absorbing material is formed in a matrix form. Herein, the adhered portion between the substrate or the rigid plate and the moisture-absorbing material refers to an area in which the substrate or the rigid plate is brought into contact with the moisture-absorbing material through an adhesive material.

In the present invention, it is preferred that the protective layer is a resin film. It is also preferred that the protective layer is formed of a first resin film disposed on the side of the scintillator layer of the scintillator sheet and a second resin film disposed on the side of the substrate, peripheries of both resin films are fused to form a fused portion so that the fused portion is within ±0.2X from the center (X/2) in the direction of the thickness of the scintillator panel, wherein X is the thickness of the scintillator panel.

In the following, there will be detailed the present invention and constituent elements thereof, and embodiments of the present invention.

Figure 1:
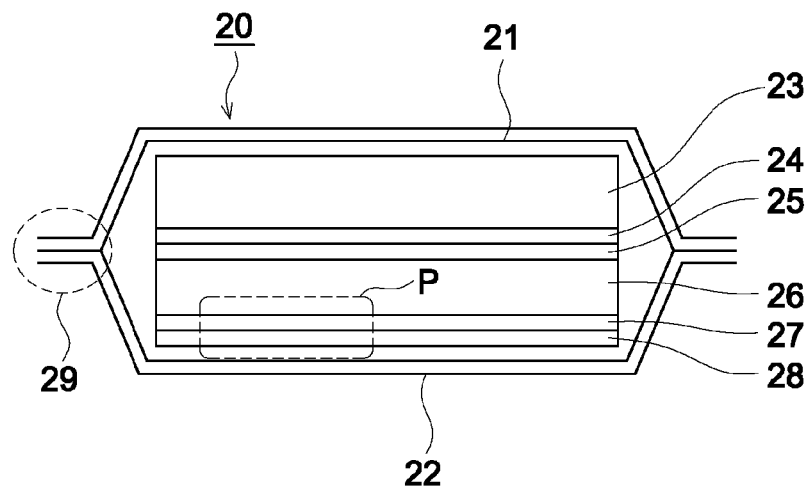
FIG. 1 is a schematic sectional view showing constitution of a scintillator panel.

FIG. 1 illustrates scintillator panel 20 having first protective layer 21 and second protective layer 22. These protective layers are fused at fused portion 29. Inside of the space created by the fused first protective layer 21 and second protective layer 22 is a scintillator layer 23 on substrate 24. Substrate 24 has an adhesive layer 25 which adheres to rigid plate 26. Rigid plate 26 has adhesion layer 27 for adhering moisture absorbent material 28.

Figure 2:
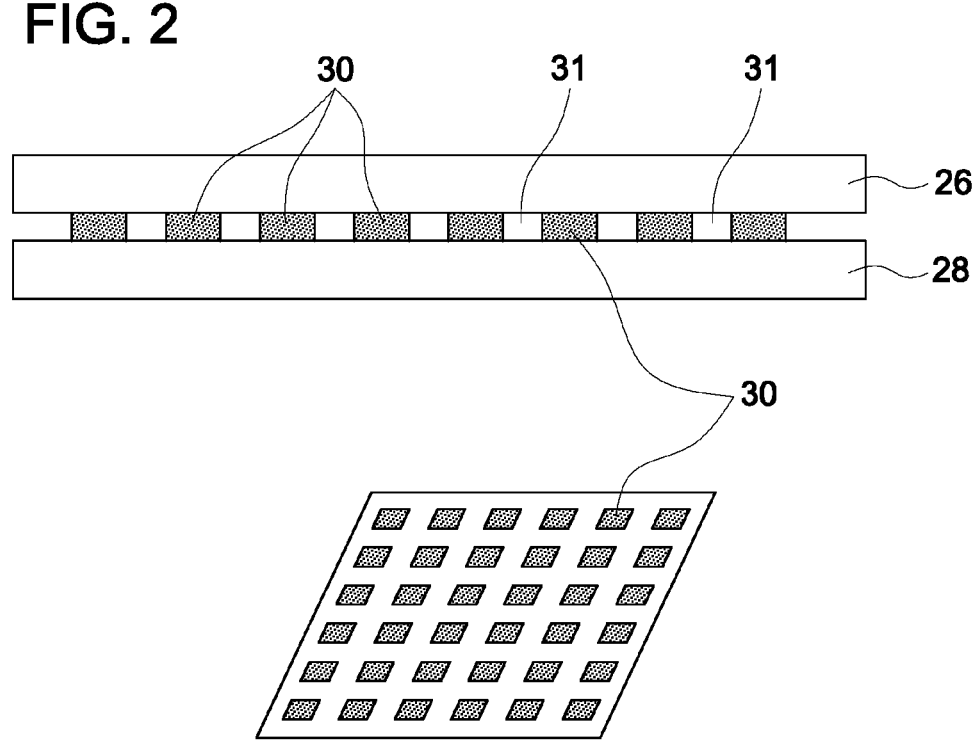
FIG. 2 is a schematic view showing the position of a moisture-absorbing material and an adhesive.

FIG. 2 illustrates section P of FIG. 1. FIG. 2 illustrates rigid plate 26 with adhesive material 30 adhered to moisture absorbent material 28. Adhesive material 30 is applied in a discontinuous manner to form, space 31 as illustrated.

Constitution of Scintillator Panel:

The scintillator panel related to the invention preferably is a scintillator panel provided with a phosphor layer comprised of columnar crystals on a polymeric film substrate, and more preferably, a sublayer is provided between the substrate and the phosphor layer. Alternatively, there may be provided a reflection layer on the substrate and the scintillator panel may comprise a reflection layer, a sublayer and a phosphor layer. Hereinafter, there will be described the individual constituting layers and constituting elements.

Phosphor Layer (Scintillator Layer):

A phosphor layer related to the present invention preferably is a phosphor layer comprised of columnar phosphor crystals. A material to form a scintillator layer related to the invention may employ a variety of commonly known phosphor materials, of which cesium iodide (CsI) is employed as a main component in the invention, since it exhibits an enhanced conversion rate of X-rays to visible light and readily forms a columnar crystal structure of a phosphor, whereby scattering of emitted light within the crystal is inhibited through the light guiding effect, rendering it feasible to increase the scintillator layer thickness.

CsI exhibits by itself a relatively low emission efficiency so that various activators are incorporated. For example, JP-B No. 54-35060 disclosed a mixture of CsI and sodium iodide (NaI) at any mixing ratio. Further, JP-A No. 2001-59899 disclosed vapor deposition of CsI containing an activator, such as thallium (Tl), europium (Eu), indium (In), lithium (Li), potassium (K), rubidium (Ru) or sodium (Na). In the present invention, thallium (Tl) or europium (Eu) is preferred, of which thallium (Tl) is more preferred.

In the present invention, it is preferred to employ, as raw materials, cesium iodide and an additive containing at least one thallium compound. Namely, thallium-activated cesium iodide (denoted as CsI:Tl), which exhibits a broad emission within the wavelength region of from 400 to 750 nm, is preferred.

There can be employed various thallium compounds (that is, a compound having an oxidation number of +I or +III) as a thallium compound contained in such an additive.

Preferred examples of thallium compounds include thallium bromide (TlBr), thalium iodide (TlI), thallium chloride (TlCl), and thallium fluoride (TlF, $TlF_3$).

The melting point of a thallium compound relating to the present invention is preferably in the range of 400 to 700° C. A melting point higher than 700° C. results in inhomogeneous inclusions of an additive within the columnar crystal, leading to a lowering of emission efficiency. In the present invention, the melting point is one under ordinary temperature and ordinary pressure.

In the scintillator layer of the present invention, the content of an additive, as described above is desirably optimized in accordance with its object or performance but is preferably from 0.001 to 50.0 mol % of cesium iodide, and more preferably from 0.1 to 10.0 mol %.

An additive content of not less than 0.001 mol % of cesium iodide results in an enhanced emission luminance obtained by cesium iodide alone, which is preferable to achieve an intended emission luminance. An additive content of not more than 50 mol % preferably makes it feasible to maintain the properties or functions of cesium iodide.

The thickness of the phosphor layer (or scintillator layer) is preferably 100 to 800 μm and more preferably 120 to 700 μm to achieve balanced characteristics of luminance and sharpness.

Reflection Layer:

In the present invention, it is preferred to provide a reflection layer (also denoted as a metal reflection layer) on the support (substrate). Light emitted from a phosphor (scintillator) is reflected, resulting in enhanced light-extraction efficiency. The reflection layer is preferably formed of a material containing an element selected from the group consisting of Al, Ag, Cr, Cu, Ni, Ti, Mg, Rh, Pt, and Au. It is specifically preferred to employ a metal thin-film composed of the foregoing elements, for example, Ag film or Al film. Such a metal thin-film may be formed of two or more layers.

When a metal thin-film is formed to two or more layers, the lower layer preferably is a layer containing Ni or Cr, whereby enhanced adhesion to the substrate is achieved. A layer comprised of a metal oxide such as $SiO_2$ or $TiO_2$ may be provided on the metal thin-film to achieve enhanced reflectance.

The thickness of a reflection layer is preferably 0.005 to 0.3 μm in terms of emission-extraction efficiency, and more preferably 0.01 to 0.2 μm.

Sublayer:

In the present invention, it is preferred in terms of adhesion to provide a sublayer between the support (substrate) and the phosphor layer, or between a reflection layer and a phosphor layer. Such a sublayer preferably contains a polymeric binder (binder), a dispersing agent or the like. The thickness of a sublayer is preferably from 0.5 to 4 μm. A thickness of more than 4 μm results in increased light scattering in the sublayer, leading to deterioration in sharpness. A thickness of more than 5 μm results in disorder of columnar crystallinity, due to the heat treatment. There will be further described constituents of a sublayer.

Polymeric Binder:

The sublayer related to the invention is formed preferably by coating a polymeric binder material (hereinafter, also denoted simply as a binder) dissolved or dispersed in a solvent, followed by drying. Specific examples of such a polymeric binder include a polyurethane, vinyl chloride copolymer, poly[(vinyl chloride)-co-(vinyl acetate)], poly[(vinyl chloride)-co-(vinylidene chloride)], poly[(vinyl chloride)-co-acrylonitrile], poly(butadiene-co-acrylonitrile), polyvinyl acetal, polyester, cellulose derivatives (e.g., nitrocellulose), polyimide, polyamide, poly-p-xylylene, poly(styrene-co-butadiene), various synthetic rubber resins, phenol resin, epoxy resin, urea resin, melamine resin, phenoxy resin, silicone resin, acryl resin and urea formamide resin. Of these, it is preferred to employ a polyurethane, a polyester, a vinyl chloride copolymer, polyvinyl butyral or nitrocellulose.

The polymeric binder related to the invention preferably is a polyurethane, a polyester, a vinyl chloride copolymer, polyvinyl butyral or nitrocellulose, in terms of adhesion to the phosphor layer. Further, a polymer exhibiting a glass transition temperature (Tg) of 30 to 100° C. is preferred in terms of adhesion of deposited crystals to the substrate. A polyester resin is specifically preferred from these points of view.

Examples of a solvent for use in preparation of a sublayer include a lower alcohol such as methanol, ethanol, n-propanol or n-butanol; a chlorine-containing hydrocarbon such as methylene chloride or ethylene chloride; a ketone such as acetone, methyl ethyl ketone or methyl isobutyl ketone; an aromatic compound such as toluene, benzene, cyclohexane, cyclohexanone or xylene; an ester of a lower carboxylic acid and a lower alcohol, such as methyl acetate, ethyl acetate or butyl acetate; an ether such as dioxane, ethylene glycol monoethyl ester, or ethylene glycol monomethyl ester; and an ether such as dioxane, ethylene glycol monoethyl ester, or ethylene glycol monomethyl ester, and their mixture.

The sublayer related to the invention may contain a pigment or a dye to inhibit scattering of light emitted from a phosphor (scintillator) to achieve enhanced sharpness.

Protective Layer

A protective layer relating to the present invention is mainly intended to protect the scintillator layer. Specifically, since highly hygroscopic cesium iodide (CsI) easily absorbs moisture upon exposure to air, resulting in deliquescence, prevention thereof is the main aim of providing a protective layer. Such a protective layer can be formed using various materials.

In a scintillator panel relating to the present invention, a protective layer can be provided on the scintillator layer of the scintillator panel.

Further, one preferred embodiment of the present invention is that the scintillator panel is sealed with a first protective film disposed on the side of the foregoing scintillator layer on one side of the substrate and a second protective layer disposed on the outside (or the other side) of the substrate, and the first protective film is not physicochemically adhered to the scintillator layer.

Herein, the expression "is not physicochemically adhered" means not being bonded via a physical interaction or a chemical reaction by use of an adhesive agent, as afore-mentioned. Such a state of not being adhered may also refer to a state in which the surface of the scintillator layer and the protective film are optically or mechanically treated almost as a non-continuous body even if the scintillator surface is in point-contact with the protective film.

In the scintillator panel of the present invention, it is preferred in terms of moisture-proofing that a protective layer is formed of the first resin film disposed on the side of the scintillator layer of the scintillator sheet and the second resin film disposed on the side of the substrate, in which circumferences of the first and second resin films are fused to form a fused portion so that the fused portion is within ±0.2X from a center (X/2) in the thickness direction of the scintillator panel, provided that X is a thickness of the scintillator panel.

When a protective layer is provided over the scintillator layer, the average surface roughness (Ra) is preferably from 0.01 to 3.0 μm. Accordingly, it is preferable to choose a protective film satisfying this requirement or to adopt forming conditions thereof. The average surface roughness (Ra) of the protective layer is more preferably from 0.01 to 1.0 μm, and still more preferably from 0.1 to 0.5 μm.

There will be described a protective film used in the present invention.

Constitution of a protective film used in the present invention include, for example, a multi-layered material having a constitution of a protective layer (which is an outermost layer)/interlayer (which is a moisture-proof layer)/innermost layer (which is a heat fusible layer). The individual layer may be multi-layered if needed.

Innermost Layer (Heat Fusible Layer):

A thermoplastic resin film as an innermost layer preferably employs EVA, PP, LDPE, LLDPE, LDPE produced by use of a metallocene catalyst, LLDPE and films obtained by mixed use of these films and HDPE film.

Interlayer (Moisture-Proof Layer):

Examples of an interlayer (moisture-proof layer) include a layer having an inorganic film, as described in JP-A No. 6-95302 and "Shinku (Vacuum) Handbook" Revised Edition, pp 132-134 (ULVC Nippon Shinku Gijutsu K.K.). Such an inorganic film includes, for example, a vapor-deposited metal film and a vapor-deposited inorganic material film.

Vapor-deposited metal films include, for example, ZrN, SiC, TiC, $Si_3N_4$, single crystal Si, ZrN, PSG, amorphous Si, W, and aluminum, and specifically preferred metal vapor-deposited film is aluminum.

Vapor-deposited inorganic material films include, for example, those described in "Hakumaku (Thin Film) Handbook" pp 879-901 (edited by Nippon Gakujutsu Shinkokai); and "Shinku (Vacuum) Handbook" Revised Edition, pp 132-134 (ULVC Nippon Shinku Gijutsu K.K.). Examples of inorganic material film include $Cr_2O_3$, $Si_xO_y$ (x=1, y=1.5-2.0), $Ta_2O_3$, ZrN, SiC, TiC, PSG, $Si_3N_4$, single crystal Si, amorphous Si, W, and $Al_2O_3$.

Resin film used as a base material of an interlayer (moisture-proof layer) may employ film materials used for packaging film of ethylene tetrafluoroethylene copolymer ETFE), high density polyethylene (HDPE), oriented polypropylene (OPP), polystyrene (PS), polymethyl methacrylate (PMMA), biaxially oriented nylon 6, polyethylene terephthalate (PET), polycarbonate (PC), polyimide, polyether styrene (PES) and the like.

Vapor-deposit film can be prepared by commonly known methods, as described in "Shinku (Vacuum) Handbook" and Hoso Gijutsu, Vol. 29, No. 8, for example, a resistance heating or high-frequency induction heating method, an electron beam (EB) method, and plasma (PCVD). The thickness of deposit film is preferably from 40 to 200 nm, and more preferably from 50 to 180 nm.

Outermost Layer:

Thermoplastic resin film used through deposited film sheet may employ polymer films used as packaging film (as described in, for example, Kinoseihosozairyo no shin-tenkai, edited by Foray Research Center Co., Ltd) of low density polyethylene (LDPE), HDPE, linear low density polyethylene (LLDPE), medium density polyethylene, casting polypropylene (CPP), OPP, oriented nylon (ONy), PET, cellophane, polyvinyl alcohol (PVA), oriented vinylon (OV), ethylene-vinyl acetate copolymer (EVOH), poltvinylidene chloride (PVDC), and a polymer of a fluorinated olefin (fluoroolefin) or a copolymer of fluorinated olefins.

Such resin film may optionally employ a multi-layer film made by co-extrusion of different kinds of films or a multi-layer film made by lamination with varying the orientation angle. Further, there may be combined film density, molecular weight distribution and the like to achieve physical properties needed for a packaging material. A thermoplastic resin film of the innermost layer employs LDPE, LLDPE, LDPE made by use of a metallocene catalyst, LLDPE, and a film made by mixed use of these films and HDPE film.

In the case of using no inorganic material-deposited film, a protective layer is required to function as an interlayer. In that case, single or plural thermoplastic films used for the protective layer may be superimposed. There may be employed, for example, CPP/OPP, PET/OPP/LDRE, Ny/OPP/LDPE, CPP/OPP/EVOH, Saran UB/LLDPE (in which Saran UB is biaxially oriented film made from vinylidene chloride/acrylic acid ester copolymer resin, produced by Asahi Kasei Kogyo Co., Ltd.), K-OP/PP, K-PET/LLDPE, K-Ny/EVA (in which "K" denotes a vinylidene chloride resin-coated film).

These protective films can be prepared by commonly known methods, for example, a wet lamination method, a dry lamination method, a hot melt lamination method, an extrusion lamination method, and a heat lamination method. When using no inorganic material-deposited film, these methods are applicable. Further, there are also applicable a multi-layer inflation system and co-extrusion molding system, depending on the materials to be used.

There are usable commonly known adhesives for lamination. Examples of such adhesives include heat-soluble thermoplastic polyolefin resin adhesives such as various kinds of polyethylene resins and polypropylene resins; heat-meltable thermoplastic resin adhesives such as ethylene copolymer resin (e.g., ethylene-propylene copolymer, ethylene-vinyl acetate copolymer, ethylene-ethyl acrylate copolymer), ethylene-acrylic acid copolymer resin and ionomer resin; and heat-meltable rubber adhesives. Examples of an emulsion or latex adhesive include emulsions of a polyvinyl acetate resin, a vinyl acetate-ethylene copolymer resin, a vinyl acetate-acrylic acid ester copolymer resin, a vinyl acetate-maleic acid ester copolymer, an acrylic acid copolymer and ethylene-acrylic acid copolymer. Typical examples of a latex type adhesive include natural rubber, styrene butadiene rubber (SBR), acrylonitrile butadiene rubber (NBR) and chloroprene rubber (CR). Adhesives used for dry lamination include an isocyanate adhesive, a urethane adhesive and polyester adhesive. There are also usable a hot melt lamination adhesive obtained by blending paraffin wax, microcrystalline wax, an ethylene-vinyl acetate copolymer resin and an ethylene-ethyl acrylate copolymer resin; a pressure-sensitive adhesive and heat-sensitive adhesive. Specific examples of a polyolefin resin adhesive used for extrusion lamination include a copolymer of ethylene and other monomers (α-olefin) such as L-LDPE resin, an ionomer resin (ionic copolymer resin) Serlin (produced by Du Pont Co.) and high Milan (produced by Mitsui Polychemical Co., Ltd.) and Admer (adhesive polymer, produced by Mitsui Sekiya Kagaku Co., Ltd.) as well as polymeric materials composed of a polyolefin resin such as polyethylene resin, polypropylene resin or polybutylene resin, and an ethylene copolymer resin (e.g., EVA, EEA). Recently, there was also used a UV-curable adhesive. Specifically, an LDPE resin and an L-LDPE resin are low in price and exhibit superior lamination altitude. A mixed resin obtained by mixing at least two of the foregoing resins to compensate drawbacks of the individual resin is specifically preferred. For instance, blending L-LDPE resin and LDPE resin results in enhanced wettability and reduced neck-in, leading to an enhanced laminating speed and reduced pinholes.

Taking into account formation of a void portion, protective property, image sharpness, moisture-proof and workability of a scintillator layer (phosphor layer), the thickness of a protective film is preferably 12 to 60 μm and more preferably 20 to 40 μm. Further, taking into account image sharpness, radiation image uniformity, production stability and workability, the haze ratio of the first protective film is preferably not less than 3% and not more than 40%, and more preferably not less than 3% and not more than 10%. The haze ratio represents a value measured, for example, by NDH 5000W of Nippon Denshoku Kogyo Co., Ltd. A targeted haze ratio can be achieved by making a choice from commercially available polymer films.

Taking into account photoelectric conversion efficiency and the scintillator emission wavelength, the light transmittance of the first protective film is preferably not less than 70% at 550 nm, and no film exhibiting a light transmittance of more than 99% is industrially available so that a transmittance of 70 to 99% is substantially preferred.

Taking into account protectivity and deliquescence of the scintillator layer, the moisture permeability of a protective film (which is measured based on JIS Z0208) is preferably not more than 50 g/m$^2$·day (40° C. 90% RH) and more preferably not more than 10 g/m$^2$·day (40° C. 90% RH). Since no film having a moisture permeability of not more than 0.01 g/m$^2$·day (40° C. 90% RH) is industrially available, the moisture permeability preferably is substantially not less than 0.01 g/m$^2$·day (40° C. 90% RH) and not more than 50 g/m$^2$·day (40° C. 90% RH) and not more than 50 g/m$^2$·day (40° C. 90% RH), and more preferably not less than 0.1 g/m$^2$·day (40° C. 90% RH) and not more than 10 g/m$^2$·day (40° C. 90% RH). Specific examples of commercially available alumina vapor-deposited PET to achieve the foregoing moisture permeability include VMPET (produced by Toyo Metalizing Co., Ltd.), MGX (produced by Topan Insatsu Co., Ltd.), and IBPET (produced by Dainippon Insatsu Co., Ltd.). These are laminated to CPP as a fusion layer to obtain the intended resin film.

Further, in another embodiment of a protective layer, an organic thin layer, for example, a poly(p-xylilene) film as a protective layer is formed on the entire surface of a scintillator layer and the substrate by a CVD (Chemical Vapor Deposition) method.

Moisture Absorbing Material:

It is preferred that a moisture-absorbing material is provided within the protective layer related to the present invention. In that case, a moisture-absorbing material is preferably provided across the substrate opposite the scintillator layer.

In the present invention, there are usable commonly known moisture-proof agents. For examples, moisture-proof agents including inorganic compounds such as sodium sulfate anhydride, a molecular sieve, and silica gel are preferred. A moisture-proof agent which does not release absorbed moisture under ordinary temperature and humidity is more preferred.

Further, the adhesion area between the substrate and the moisture-absorbing material is preferably in the range of 10 to 90% of the total area of the substrate of the side to be adhered. The adhered portion between the substrate and a moisture-absorbing material is formed preferably in a matrix form. Herein, the matrix form refers to a state in which spaces are present in a lattice form or partially between an adhered portion and another adhered portion, securing a width capable of allowing gas to flow. To attain such an adhesion state, adhesion material (adhesive) is coated onto release paper with irregularities and then, a core material is layered, in which an adhesive double coated sheet with a lot of protrudent portions is preferable. Spacing of adhesive materials (adhesives) can be freely controlled by variation of irregularities of the release paper. There are also usable commonly known adhesive materials (adhesives). In the present invention, "space" refers to a non-adhered portion on an adhesion layer between a substrate or a rigid plate and a moisture-absorbing material.

Substrate:

The scintillator panel of the present invention preferably employs resin film as a substrate. Examples of such resin film include cellulose acetate film, polyester film, polyethylene terephthalate (PEN) film, polyamide film, polyimide (PI) film, triacetate film, polycarbonate film, and carbon fiber reinforced film. A resin film containing polyimide is specifically suitable when forming phosphor columnar crystals in a gas phase process by using cesium iodide as a raw material.

A resin film as a substrate related to the invention preferably is a 50-500 μm thick, flexible resin film.

Herein, the flexible substrate refers to a substrate exhibiting an elastic modulus at 120° C. (also denoted as E120) of 1000 to 6000 N/mm$^2$. Such a substrate preferably is a resin film containing polyimide or polyethylene naphthalate.

In the region showing a linear relationship between strain and corresponding stress which is measured by using a tensile strength tester based on JIS C 2318, the elastic modulus is calculated as the slope of the straight portion of the stress-strain curve, that is, a strain divided by a stress, which is also referred to as a Young's modulus. In the invention, such a Young's modulus is also defined as the elastic modulus.

The substrate used in the invention preferably exhibits an elastic modulus at 120° C. (E120) of 1000 to 6000 N/mm$^2$, and more preferably 1200 to 5000 N/mm$^2$.

Specific examples include resin film comprised of polyethylene naphthalate (E120=4100 N/mm$^2$), polyethylene terephthalate (E120=1500 N/mm$^2$), polybutylene naphthalate (E120=1600 N/mm$^2$), polycarbonate (E120=1700 N/mm$^2$), syndiotactic polystyrene (E120=2200 N/mm$^2$), polyether imide (E120=1900 N/mm$^2$), polyacrylate (E120=1700 N/mm$^2$), polysulfone (E120=1800 N/mm$^2$), or polyether sulfone (E120=1700 N/mm$^2$).

These may be used singly or mixedly, or laminated. Of these resin films, a resin film comprising polyimide or polyethylene naphthalate is preferred.

Adhesion of the scintillator panel to the surface of a planar light receiving element is often affected by deformation or warpage of the support (substrate) during deposition, rendering it difficult to achieve a uniform image quality characteristic within the light receiving surface of a flat panel detector. In such a case, a 50-500 μm thick polymer film is used as the support (substrate), whereby the scintillator panel is deformed with being fitted to the form of the surface of a planar light receiving element, leading to uniform sharpness overall of the light-receiving surface of the flat panel detector.

Rigid Plate:

In the scintillator plate of the present invention, it is preferable to dispose a rigid plate on the side of the substrate, not forming a scintillator layer to inhibit occurrence of image defects due to difference in thermal expansion along with temperature variation. The rigid plate preferably is a plate mainly composed of carbon or a glass plate mainly composed of glass. Examples of such a plate (support) mainly composed of carbon include carbon fiber reinforced plastic, amorphous carbon and aramid laminated plate. A glass plate can employ silica glass, soda-lime glass, non-alkali glass and the like without any specific restriction. It is preferable to a rigid plate exhibiting a higher rigidity than a phosphor-supporting substrate. It is preferable to employ non-alkali glass exhibiting a thermal expansion coefficient close to TFT glass when set to FPD and also exhibiting low X-ray absorbance.

Figure 3:
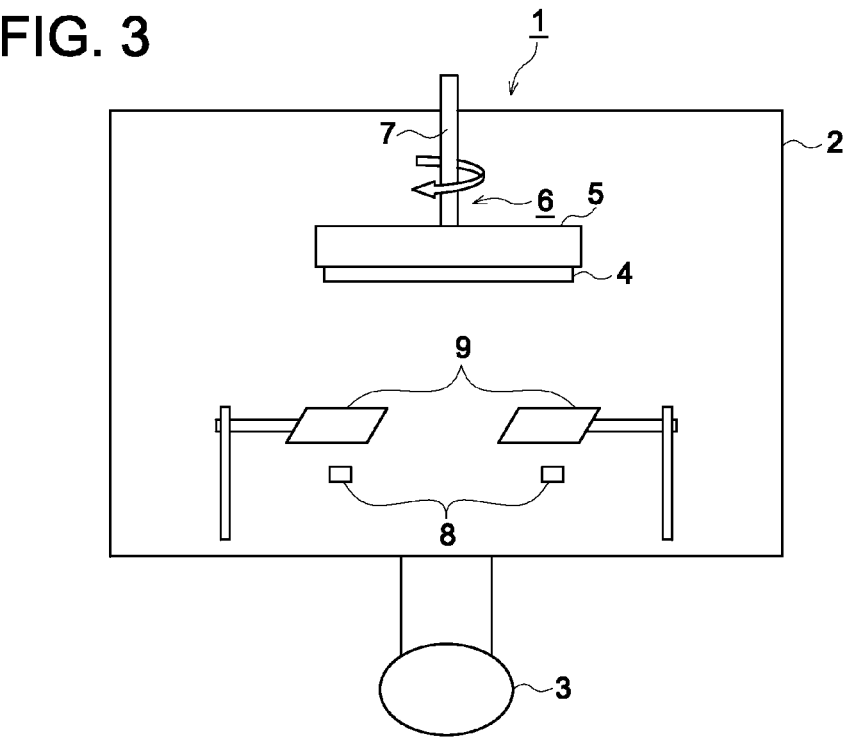
FIG. 3 is a schematic view of a production apparatus for a scintillator panel.

Production Device of a Scintillator Panel:

FIG. 3 illustrates a schematic constitution of a production device of a scintillator panel related to the invention. As illustrated in FIG. 3, a production device 1 of a scintillator panel is provided with a vacuum vessel 2 and the vacuum vessel 2 is provided with a vacuum pump 3 to evacuate the inside of the vacuum vessel 2 and to introduce atmosphere.

A support holder 5 to hold a support 4 is provided near the topside within the vacuum vessel 2.

A phosphor layer is formed on the surface of the support 4 by a process of vapor phase deposition. The process of vapor phase deposition may employ a vapor deposition method, a sputtering method, a CVD method, an ion-plating method or the like, of which the vapor deposition method is preferred in the invention.

A holder 5 supports the substrate 4 that the support surface to form the phosphor layer is opposed to and is also parallel to the bottom face of the vacuum vessel 2.

The support holder 5 is preferably provided with a heater (which is not shown in the drawing) to heat the support 4. Heating the substrate by the heater achieves enhanced contact of the substrate to the support holder 5 and controls layer quality of the phosphor layer. Further, adsorbate on the surface of the support 4 is also eliminated or removed to inhibit generation of an impurity layer between the surface of the support 4 and a phosphor described later.

Further, there may be provided, as a heating means, a mechanism (not shown in the drawing) to circulate a warming medium or heating medium. Such a means is suitable when performing vapor deposition with maintaining the support 4 at a relatively low temperature of 50 to 150° C.

There may be provided a halogen lamp (not shown in the drawing) as a heating means. This means is suitable when performing vapor deposition with maintaining the support 4 at a relatively high temperature of not less than 150° C.

The support holder 5 is provided with a rotation mechanism 6 to rotate the support 4 in the horizontal direction. The support rotation mechanism 6 is constituted of a support rotation shaft 7 to rotating the support 4 with supporting the support holder 5 and a motor (not shown in the drawing) which is disposed outside the vacuum vessel and is a driving source of the support rotation shaft 7.

In the vicinity of the bottom surface within the vacuum vessel 2, evaporation sources 8a and 8b are disposed at positions opposed to each other on the circumference of a circle centered on a center line vertical to the support 4. In that case, the distance between the support 4 and the evaporation source 8a or 8b is preferably from 100 to 1500 mm, and more preferably from 200 to 1000 mm. Further, the distance the center line vertical to the substrate 1 and the evaporation source 8a or 8b is preferably from 100 to 1500 mm, and more preferably from 200 to 1000 mm.

The radiation scintillator production device may be provided with three or more evaporation sources, in which the individual evaporation sources may be disposed at equivalent intervals or different intervals. The radius of a circle centered on a center line vertical to the support 4 can arbitrarily be set.

The evaporation sources 8a and 8b, which house a phosphor and heat it by a resistance heating method, may be constituted of an alumina crucible wound by a heater, a boat or a heater of a metal with a high melting point. Methods of heating a phosphor include heating by an electron beam and high-frequency induction heating, but in the invention, a method of resistance-heating by direct current or a method of resistance-heating indirectly a crucible by a circumferential heater is preferable in terms of ease of operation by a relatively simple constitution and low price and also being applicable to many substances. The evaporation sources 8a and 8b may be a molecular beam by a molecular source epitaxial method.

A shutter 9 which is operable in the horizontal direction is provided between the evaporation sources 8a and 8b and the support 4 to intercept the space from the evaporation sources 8a and 8b to the support 4; this shutter 9 prevents substances except the objective material which were attached to the phosphor surface and have been evaporated at the initial stage of vapor deposition from adhering onto the support 4.

Production Method of Scintillator Panel:

Next, there will be described a production method of a scintillator panel related to the invention by using a production device 1 of the foregoing scintillator panel, as shown in FIG. 3.

First, the support 4 is placed onto the support holder 5. Further, evaporation sources 8a and 8b are disposed on the circumference of a circle centered on a center line vertical to the support 4 in the vicinity of the bottom of the vacuum vessel 2. In that case, the space between the support 4 and the evaporation sources 8a and 8b is preferably from 100 to 1500 mm, and more preferably from 200 to 1000 mm. The space between the center line vertical to the support 4 and evaporation sources 8a and 8b is preferably from 100 to 1500 mm, and more preferably from 200 to 1000 mm.

Subsequently, the inside of the vacuum vessel 2 is evacuated to control the evacuation degree to the desired level. Then, while rotating the support holder 5 by the support rotation mechanism 6 with respect to the evaporation sources 8a and 8b, the phosphor is evaporated from the heated evaporation sources 8a and 8b to allow the phosphor to grow on the surface of the support 4 to an intended thickness.

The process of growing a phosphor on the surface of the support 4 may be divided to plural steps to form a phosphor layer.

In the vapor deposition method, a material subject to deposition (the support 4, protective layer or intermediate layer) may appropriately be heated or cooled during vapor deposition.

After completing vapor deposition, the phosphor layer may be subjected to a heating treatment. There may optionally be conducted a reactive deposition in which deposition is performed, while introducing gas such as $O_2$ or $H_2$.

The thickness of the formed phosphor layer, which is different depending on intended use or the kind of a phosphor, is from 50 to 2000 μm, preferably 50 to 1000 μm, and more preferably from 100 to 800 μm.

The temperature of the support 4 on which a phosphor layer is to be formed, is set preferably to the range of room temperature (rt) to 300° C., and more preferably 50 to 250° C.

After forming the phosphor layer, a protective layer to physically or chemically protect the phosphor layer may be provided on the phosphor layer opposite to the support 4. A coating solution for a protective layer may be directly coated onto the phosphor layer surface or a protective layer which was previously formed may be adhered to the phosphor layer. The thickness of such a protective layer is preferably from 0.1 μm to 2000 μm.

Alternatively, a protective layer may be formed by depositing an inorganic substance such as SiC, $SiO_2$, SiN or $Al_2O_3$ through a vapor deposition method, sputtering method or the like.

In the present invention, there may be provided various functional layers other than the protective layer.

In the production device 1 for a scintillator panel or the production method thereof, plural evaporation sources 8a and 8b are provided, whereby the overlapping portion of vapor streams from evaporation sources 8a and 8b are straightened, resulting in uniform crystallinity of a phosphor deposited on the surface of the support 4. In that case, more evaporation sources 8a and 8b are provided, vapor streams are straightened at a larger number of portions, resulting in uniform crystallinity over a broader region.

Further, when evaporation sources 8a and 8b are disposed on the circumference of a circle centered on a center line vertical to the support 4, such an action of unifomalizing crystallinity by straightening vapor streams can be isotropically achieved on the surface of the support 4.

Further, performing deposition of a phosphor with rotating the support 4 by the support rotation mechanism 6 can achieve uniform deposition of the phosphor on the surface of the support 4.

In the production device 1 or the production method of the scintillator panel related to the invention, as described above, the phosphor layer is allowed to grow so that the crystallinity of the phosphor becomes uniform, thereby achieving enhanced sharpness in the radiation image obtained from the radiation image conversion panel by using the scintillator panel related to the invention.

Further, restriction of the incident angle of the foregoing phosphor to be deposited on the support 4 to the prescribed region to inhibit fluctuation in the incident angle of the phosphor results in uniformity crystallinity of the phosphor and enhanced sharpness of the obtained radiation image.

In the foregoing, there are described cases when the support holder 5 is provided with the support rotation mechanism 6, but the invention is not limited to these but is also applicable to those cases, including, for example, the case of performing evaporation, while the support holder 5 holding the support 4 at rest; and the case of depositing the phosphor from the evaporation source 8a or 8b, while the support 4 is in the horizontal direction to the evaporation sources 8a and 8b.

Radiation Image Detector:

The radiation image detector related to the present invention is featured in that the detector is installed with, on the first substrate, a scintillator panel provided with a phosphor layer capable of converting radiation to light. It is preferable to be constituted of various kinds of functional layers other than the phosphor layer in accordance with the object.

The radiation image detector comprises a scintillator panel provided with a phosphor layer formed by a process of gas phase deposition on a first substrate through a functional layer such as a reflection layer, and adhered to or brought into contact with a photoelectric conversion panel provided with a photoelectric conversion element section (planar light-receiving device) in which picture elements comprised of a photosensor and TFT (Thin Film Transistor) or CCD (Charge Coupled Devices) are two-dimensionally arranged on a second substrate.

Figure 4:
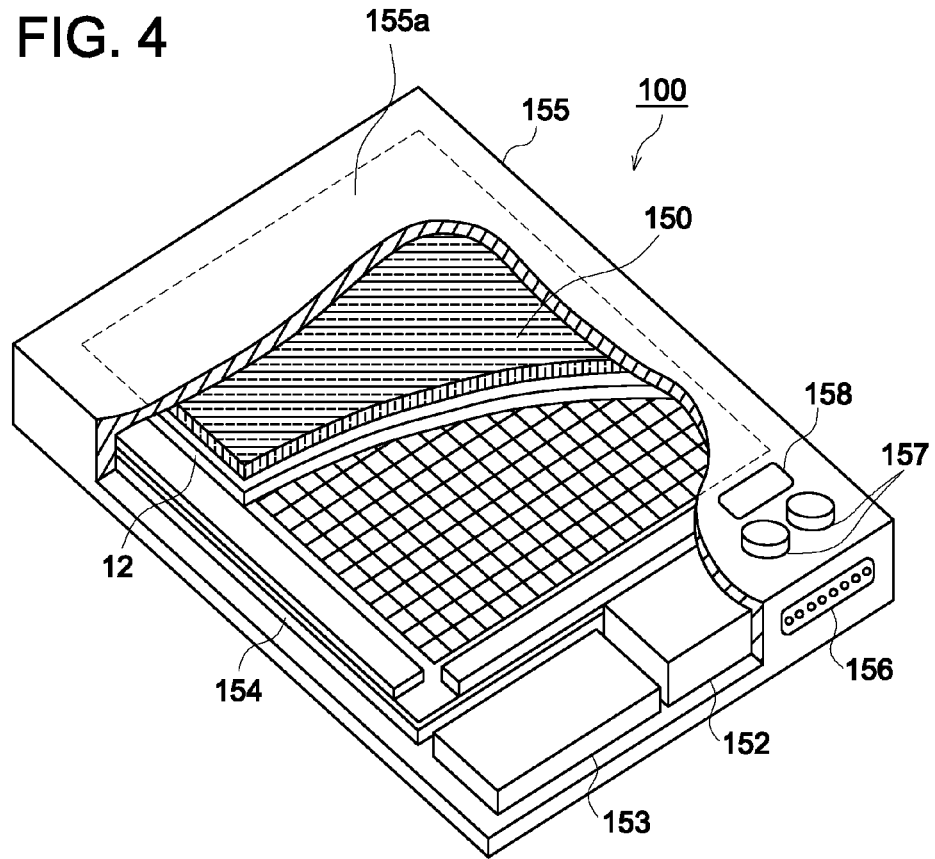
FIG. 4 is a perspective sectional view of a radiation image detector, with being partially sectioned.

In the following, there will be described constitution of a radiation image detector 100, provided with a scintillator panel 12 used for radiation with reference to FIG. 4. FIG. 4 shows a perspective sectional view, with being partially sectioned, of the radiation image detector 100.

There is disposed a polyurethane foam (foam material) 150 in spaces between the scintillator panel 12 and a protective cover 155a provided on the radiation-incident side of a housing 155.

In the radiation image detector 100, as shown in FIG. 4, a scintillator panel 12, a control section 152 to control movement of the radiation image detector 100, a memory section 153 to memorize image signals outputted from the scintillator panel 12 by using rewritable dedicated memory (e.g., flash memory), and a power source section 154 of a power supplier to supply a power necessary to obtain image signals by driving the radiation image detector are provided in the interior of a housing 155. The housing 155 is provided with a connector 156 for communication to communicate from the radiation image detector 100 to the exterior if needed, an operation section 157 to change motion of the radiation image detector 100, a display section 158 to show completion of preparation for picture-taking or writing-in of an prescribed amount of image signals to a memory section 153, and the like.

Herein, if the radiation image detector 100 is provided with the memory section 153 to memorize image signals of a radiation image together with the power source section 154 and is designated to be detachable through the connector 156, the radiation image detector 100 can become a portable structure.

The radiation scintillator panel 12 is disposed on the side of the radiation-exposed surface and is constituted so as to emit an electromagnetic wave in accordance with the intensity of incident radiation.

EXAMPLES

In the following, the present invention will be further described in detail by the reference to specific examples, but the present invention is not limited thereto.

Evaluation I
Preparation of Scintillator Panel
Scintillator Layer:

To cesium iodide (CsI) was added TlI as an additive to obtain an evaporation material. Namely, an evaporation material including 0.3 mol % TlI, based on CsI was prepared. The evaporation material was placed into a resistance heating crucible and onto a rotary support holder was placed a 125 μm thick polyimide resin substrate provided with a reflection layer (silver: 70 nm thickness) and a sublayer (polyester resin: 3.0 μm thickness), and the distance between the substrate and two evaporation sources was adjusted to 400 mm.

Subsequently, after evacuating the inside of an evaporation device, Ar gas was introduced thereto to control a vacuum degree to 0.1 Pa and the temperature of a substrate 4 was maintained at a temperature of 200° C., while rotating the support holder. Subsequently, the resistance heating crucible containing the evaporation material was heated to evaporate a phosphor for a scintillator. When the thickness of a scintillator (phosphor layer) reached 400 μm, evaporation was terminated to obtain a scintillator sheet.

Adhesion:

A moisture absorbing material (DRY KEEP, produced by Sasaki Kagaku Yakuhin Co., Ltd., 84 μm thickness) was adhered to a rigid plate (glass plate, Eagle 2000 (100 mm×100 mm×0.5 mm t, produced by Corning Co.) by using matrix tapes differing in adhesion area (produced by Nichiei Kako Co., Ltd.). The adhesion area of the moisture absorbing material to the rigid plate was controlled by an adhesive tape to be adhered, as shown in Table 1.

Subsequently, a scintillator sheet was cut to a size of 100 mm×100 mm and using a matrix tape of the same size, the scintillates was adhered to a rigid plate (side opposite the adhered moisture absorbing material).

Sealing:

A sample having completed adhesion was inserted into a resin film and sealed under reduced pressure of −95 kPa to obtain a scintillator panel of the present invention.

The foregoing resin film was a film comprised of PET (24 μm thickness)/adhesion layer/CPP (20 μm thickness).

Comparative Example

A scintillator sheet was prepared similarly to the foregoing Examples. The thus prepared scintillator sheet was placed into a vapor deposition room of a CVD device and further thereon, a 50 μm thick poly(para-xylylene) layer was formed, whereby a scintillator panel of comparative example was obtained.

Evaluation

The prepared scintillator plates were each mounted on Pax Scan 2520 (FPD produced by Varian Co.) and evaluated with respect to sharpness in accordance with the procedure, as below.

Evaluation of Sharpness:

X-rays at a tube voltage 80 kVp were exposed onto the radiation-incident surface (the side on which no phosphor layer was formed) of each sample through a lead MTF chart, and the image data were detected and recorded onto a hard disk. Then, the data recorded on the hard disk was analyzed via a computer, and the modulation transfer function MTF (MTF values in % of a spatial frequency of 1 cycle/mm) of the X-ray image recorded on the foregoing hard disk was calculated as a measure of sharpness.

Evaluation of Moisture Resistance:

The foregoing scintillator plates were allowed to stand under an atmosphere of 30° C. and 70% humidity over 3 days and evaluated with respect to sharpness, whereby sharpness before and after being allowed to stand was compared to determine a deterioration ratio of sharpness. Evaluation of sharpness was carried out in the same manner as described above and an average value with respect to ten portions within the scintillator was determined for each sample.

In accordance with the procedure described above, panels of Examples 1-6 and Comparative Example were prepared and evaluated. The results thereof are shown in Table 1. It was proved that, when an adhesion area between a moisture-absorbing material and a rigid plate fell within a range of 10 to 90%, scintillator panels of enhanced moisture resistance were obtained.

TABLE 1

|  | Presence of Space within Scintillator Panel | Adhesion Area (%) | Deterioration Ratio of Sharpness (%) |
| --- | --- | --- | --- |
| Example 1 | Yes | 8 | −2 |
| Example 2 | Yes | 15 | −3 |
| Example 3 | Yes | 50 | −5 |
| Example 4 | Yes | 88 | −6 |
| Example 5 | Yes | 93 | −23 |
| Example 6 | Yes | 100 | −30 |
| Comparative Example | No. | — | −55 |

Evaluation II
Preparation of Scintillator Panel
Scintillator Layer:

Scintillator sheets were prepared similarly to Evaluation I.

Adhesion:

Adhered panels were prepared similarly to Evaluation I. The adhesive used for a moisture-absorbing material (DRY KEEP) was Matrix Tapes (produced by Nichiei Kako Co., Ltd.). The adhesion area was 60%.

Sealing:

A sample having been adhered was inserted into a resin film and sealed under reduced pressure of −95 kPa.

The position of the fused portion was controlled by varying thicknesses of resin films of the first protective layer and the second protective layer. When the rigidity of the first resin film and that of the second resin film were approximately equivalent, the position of a fused portion fell within ±20% of the center in the thickness direction of a panel. The rigidity of film becomes greater approximately in accordance with its thickness.

Simple Measurement Method of Film Rigidity:

A resin film was cut to a size of 11 cm×2 cm. One end (approximately, 1 cm) was fixed onto a level desk and on the other end, a 0.5 g weight was fixed by a tape. The quantity of flexure by fixing the 0.5 g weight was measured as a simple evaluation value of rigidity. A larger value indicates lower rigidity.

Measurement Method of Position of Fused Portion:

A sealed scintillator panel was placed on a level plane and there was measured the height of the fused portion from the level plane as a base. When the height of the fused portion fell within the range of the center of the height (X)±20%, gas flow within the protective layer of a scintillator panel became smoother. Further, damage to resin film, due to angle portions of a scintillator sheet, was minimally inhibited. Namely, inhibition of destruction of the intermediate layer (moisture-resistant layer) of the resin film rendered it feasible to maintain moisture resistance of the scintillator panel.

Resin films used in Examples 7-13 and their results are shown in Tables 2 and 3 (in which designation "//" represents the adhesion layer).

Further, panels of Examples 7-13 were prepared in accordance with the foregoing procedure and evaluated in the manner described above. Results are shown in Tables 2 and 3.

Table 2

|  | Position of Fused Portion (position of plate in depth direction) | Deterioration Ratio of Sharpness (%) |
| --- | --- | --- |
| Example 7 | X | −20 |
| Example 8 | X/2 + 0.3X | −15 |
| Example 9 | X/2 + 0.1X | −3 |
| Example 10 | X/2 | −1 |
| Example 11 | X/2 − 0.1X | −5 |
| Example 12 | X/2 − 0.3X | −14 |
| Example 13 | 0 | −23 |

TABLE 3

|  | First Protective Layer | | Second Protective Layer | |
| --- | --- | --- | --- | --- |
|  | Constitution | Quantity of Flexure | Constitution | Quantity of Flexure |
| Example 7 | PET(24)//CPP(20) | 9 cm | CPP(20)//Al(7)//PET(12) | 10 cm |
| Example 8 |  |  | CPP(30)//Al(7)//PET(12) | 9.6 cm |
| Example 9 |  |  | CPP(40)//Al(7)//PET(12) | 9.3 cm |
| Example 10 |  |  | CPP(40)//Al(9)//PET(25) | 8.8 cm |
| Example 11 |  |  | CPP(40)//Al(9)//PET(38) | 8.5 cm |
| Example 12 |  |  | CPP(40)//Al(9)/PET(50) | 7.4 cm |
| Example 13 |  |  | CPP(40)//Al(9)//PET(100) | 5 cm |

As is apparent from the results shown in Tables 2 and 3, it was proved that when the height of the fused portion fell within the range of the center of the height (X)±20%, there were achieved scintillator panels exhibiting excellent moisture resistance.

DESCRIPTION OF NUMERAL

1: Production device 1 of a scintillator panel
2: Vacuum vessel
3: Vacuum pump
4: Support
5: Support holder
6: Support rotation mechanism
7: Support rotation shaft
8: Evaporation source
9: Shutter
10: Shield Plate
12: Scintillator plate
20: Scintillator panel
21: First protective layer (resin film)
22: Second protective layer (resin film)
23: Scintillator layer (phosphor layer)
24: Substrate
25: Adhesion layer
26: Rigid plate
27: Adhesion layer
28: Moisture-absorbing material
29: Fused portion
30: Adhesive material
31: Space
100: Radiation image detector

What is claimed is:

1. A scintillator panel comprising a scintillator sheet provided on a substrate with a scintillator layer, and the whole of the scintillator sheet is covered with a protective layer and a space in which gas is capable of flowing is provided between the protective layer and a top surface of the scintillator sheet, the top surface of the scintillator sheet being on an opposite side of the scintillator layer to the surface of the scintillator layer in contact with the substrate.

2. The scintillator panel as claimed in claim 1, wherein a moisture-absorbing material is disposed within the protective layer.

3. The scintillator panel as claimed in claim 2, wherein a rigid plate is disposed on an opposite side of the substrate to the scintillator layer.

4. The scintillator panel as claimed in claim 3, wherein the moisture-absorbing material is disposed on an opposite side of the substrate to the scintillator layer.

5. The scintillator panel as claimed in claim 4, wherein an adhered portion between the substrate or the rigid plate and the moisture-absorbing material is formed in a matrix form.

6. The scintillator panel as claimed in claim 1, wherein the protective layer is a resin film.

7. The scintillator panel as claimed in claim 6, wherein the protective layer is formed of a first resin film disposed on the side of the scintillator layer of the scintillator sheet and a second resin film disposed on the side of the substrate, peripheries of both resin films are fused to form a fused portion so that the fused portion is within ±0.2X from a center (X/2) in a direction of a thickness of the scintillator panel, wherein X is a thickness of the scintillator panel.

8. A scintillator panel comprising scintillator sheet provided on a substrate with a scintillator layer, and the whole of the scintillator sheet is covered with a protective layer and a space in which gas is capable of flowing is provided between the protective layer and the scintillator sheet,
wherein a moisture-absorbing material is disposed within the protective layer,
wherein the moisture-absorbing material is disposed on an opposite side of the substrate to the scintillator layer, and
wherein an adhesion area between the substrate and the moisture-absorbing material is in a range of 10 to 90% of a total area of the substrate or the rigid plate of the side to be adhered.

9. The scintillator panel as claimed in claim 8, wherein an adhered portion between the substrate and the moisture-absorbing material is formed in a matrix form.

10. The scintillator panel as claimed in claim 8, wherein the protective layer is a resin film.

11. The scintillator panel as claimed in claim 10, wherein the protective layer is formed of a first resin film disposed on the side of the scintillator layer of the scintillator sheet and a second resin film disposed on the side of the substrate, peripheries of both resin films are fused to form a fused portion so that the fused portion is within ±0.2X from a center (X/2) in a direction of a thickness of the scintillator panel, wherein X is a thickness of the scintillator panel.

12. A scintillator panel comprising a scintillator sheet provided on a substrate with a scintillator layer, and the whole of the scintillator sheet is covered with a protective layer and a space in which gas is capable of flowing is provided between the protective layer and the scintillator sheet,
wherein a rigid plate is disposed on an opposite side of the substrate to the scintillator layer,
wherein a moisture-absorbing material is disposed on an opposite side of the rigid plate to the substrate,
wherein an adhesion area between the rigid plate and the moisture-absorbing material is in a range of 10 to 90% of a total area of the substrate or the rigid plate of the side to be adhered.

13. The scintillator panel as claimed in claim 12, wherein an adhered portion between the rigid plate and the moisture-absorbing material is formed in a matrix form.

14. The scintillator panel as claimed in claim 12, wherein the protective layer is a resin film.

15. The scintillator panel as claimed in claim 14, wherein the protective layer is formed of a first resin film disposed on the side of the scintillator layer of the scintillator sheet and a second resin film disposed on the side of the substrate, peripheries of both resin films are fused to form a fused portion so that the fused portion is within ±0.2X from a center (X/2) in a direction of a thickness of the scintillator panel, wherein X is a thickness of the scintillator panel.

* * * * *